(12) United States Patent
Sood et al.

(10) Patent No.: US 7,826,427 B2
(45) Date of Patent: Nov. 2, 2010

(54) METHOD FOR SECURE TRANSFER OF DATA TO A WIRELESS DEVICE FOR ENABLING MULTI-NETWORK ROAMING

(75) Inventors: Kapil Sood, Beaverton, OR (US); Vijay Sarathi Kesavan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 686 days.

(21) Appl. No.: 11/843,189

(22) Filed: Aug. 22, 2007

(65) Prior Publication Data

US 2009/0052393 A1    Feb. 26, 2009

(51) Int. Cl.
*H04W 4/00* (2009.01)
(52) U.S. Cl. .................. 370/331; 370/338; 455/411; 455/432.1; 726/4
(58) Field of Classification Search .................. None
See application file for complete search history.

(56) References Cited

U.S. PATENT DOCUMENTS

| | | | |
|---|---|---|---|
| 5,898,780 A * | 4/1999 | Liu et al. ................ 713/155 |
| 7,447,177 B2 * | 11/2008 | Fudim et al. ............ 370/331 |
| 2004/0073786 A1 * | 4/2004 | O'Neill et al. .......... 713/155 |
| 2004/0215957 A1 * | 10/2004 | Moineau et al. ........ 713/153 |
| 2006/0023682 A1 * | 2/2006 | Tamura .................. 370/338 |
| 2006/0067246 A1 * | 3/2006 | Moon .................... 370/252 |
| 2007/0184832 A1 * | 8/2007 | Faccin et al. ......... 455/432.1 |
| 2008/0316988 A1 * | 12/2008 | Lee et al. ............... 370/338 |
| 2009/0022152 A1 * | 1/2009 | Henry et al. ........... 370/389 |

* cited by examiner

*Primary Examiner*—Min Jung
(74) *Attorney, Agent, or Firm*—Grossman, Tucker, Perreault & Pfleger, PLLC

(57) ABSTRACT

Disclosed is a method for secure transfer of data for enabling roaming of the wireless device between a plurality of wireless networks. The wireless device data from an authentication server via a first channel. The authentication server sends the request for the data to an information server using a second channel. The information server generates the data bases on parameters of the wireless device and provides the data to the wireless device through the authentication server. The secure transfer of data to the wireless device enables roaming of the wireless device in a plurality of wireless networks.

20 Claims, 3 Drawing Sheets

US 7,826,427 B2

1

METHOD FOR SECURE TRANSFER OF DATA TO A WIRELESS DEVICE FOR ENABLING MULTI-NETWORK ROAMING

FIELD OF THE DISCLOSURE

The present disclosure relates to roaming by a wireless device in multiple networks, and, more particularly, to secure transfer of data from an information server to the wireless device to enable roaming of the wireless device in multiple networks.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the disclosure is not intended to be limited to the specific forms set forth herein. It is understood that various omissions, substitutions of equivalents are contemplated as circumstances may suggest or render expedient, but such are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

Figure 1:
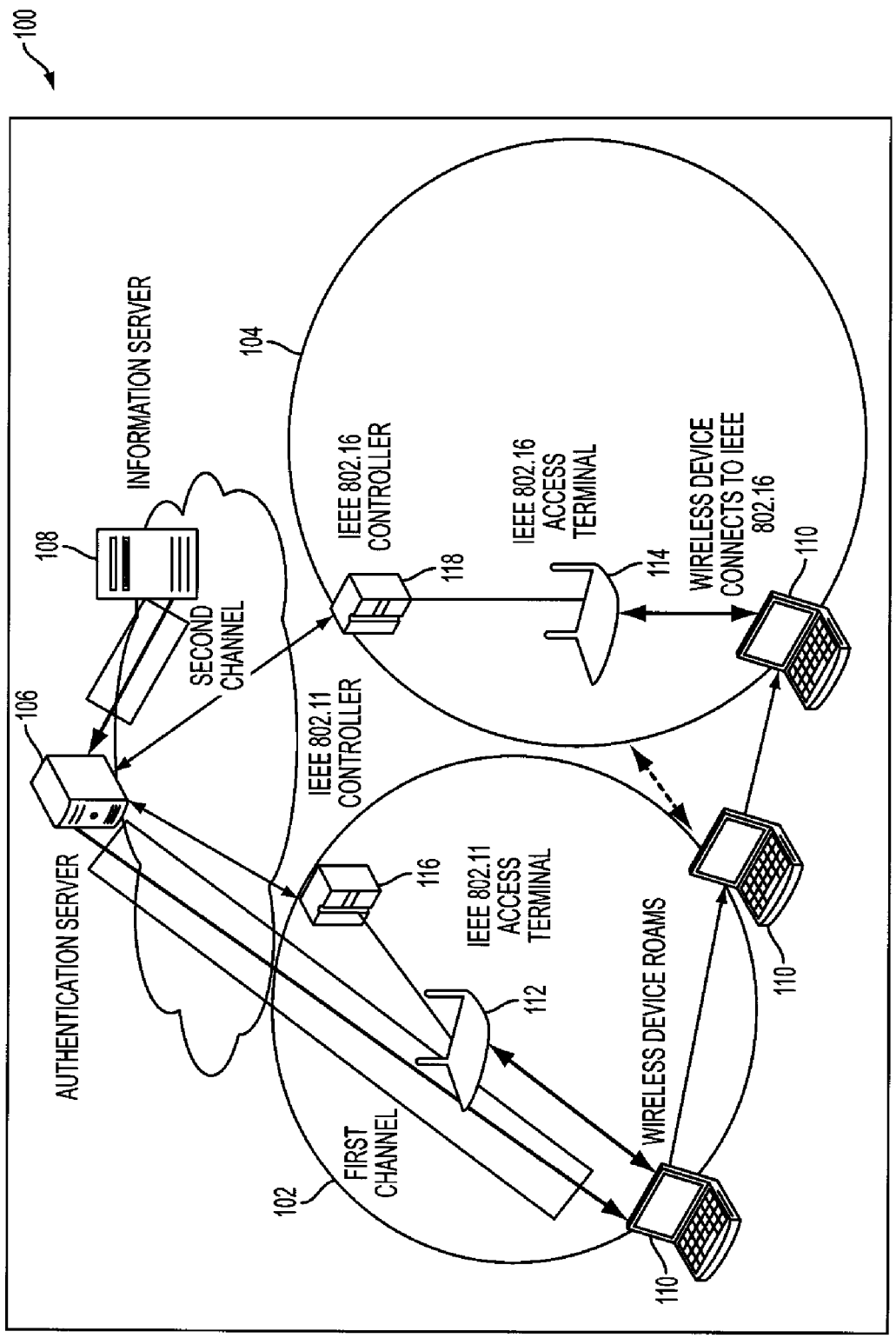
FIG. 1 illustrates an environment in which various embodiments of the present disclosure may be practiced.

FIG. 1 illustrates an environment 100 in which various embodiments of the present disclosure may be practiced. The environment 100 comprises a plurality of wireless networks including an Institute of Electrical & Electronics Engineers (IEEE) 802.11 Wireless Fidelity (Wi-Fi) network 102, an IEEE 802.16 Worldwide Interoperability for Microwave Access (WiMAX) network 104 and a third Generation (3G) wireless network (not shown in the FIG. 1). The environment 100 further comprises an authentication server 106, an information server 108 and a wireless device 110. The IEEE 802.11 Wi-Fi network 102 comprises an IEEE 802.11 access terminal 112 and an IEEE 802.11 controller 116. The IEEE 802.16 WiMAX network 104 comprises an IEEE.802.21

2 access terminal 114 and an IEEE 802.16 controller 118. The information server 108 may be configured to support information service as may be defined by an IEEE 802.21 protocol, and may further operate as a repository of the characterization and location of the networks of the system 100.

The wireless device 110 is a computing device capable of roaming in a plurality of wireless networks. The wireless device 110 is capable of connecting wirelessly to the IEEE 802.11 Wi-Fi network 102 through an IEEE 802.11 access terminal 112. The IEEE 802.11 access terminal 112 is in operative communication with the IEEE 802.11 controller 116. Furthermore, the IEEE 802.11 controller 116 communicates operatively with the authentication server 106. Similarly, the wireless device 110 is capable of connecting wirelessly to the IEEE 802.16 WiMAX network 104 through the IEEE 802.16 access terminal 114. The IEEE 802.16 access terminal 114 is in operative communication with the IEEE 802.16 controller 118, which in turn is in operative communication with the authentication server 106. The authentication server 106 communicates operatively with the information server 108. Examples of the wireless device 110 include, but are not limited to, a personal computing device such as a laptop and a personal digital assistant (PDA). The authentication server 106 may be an Extensible Authentication Protocol (EAP) server. The information server 108 may be an IEEE 802.21 information server.

The wireless device 110 typically procures data, such as a roaming policy, and or information service data (as may be defined under the aforementioned 802.21 protocol) such as network discovery policy and/or a network attribute, from the information server 108 to roam in the plurality of wireless networks. The data enables the wireless device 110 to switch connection to another network in the plurality of wireless networks, for example a switch from the IEEE 802.11 Wi-Fi network 102 to the IEEE 802.16 WiMAX network 104. The information server 108 may be configured to generate information service data (e.g., 802.21 data) and/or data attributable to different protocols. Further, information server 108 may be configured to generate the roaming policy data. In other embodiments, another server, in addition to server 108, may be used to generate the roaming policy data and or other data and may communicate using a second channel, as depicted in FIG. 1. Examples of the type of data include, but are not limited to, a billing information, a roaming information, a security information, a usage restriction, a network selection criteria, a user configured service choice and a characteristic of the plurality of wireless networks.

The present disclosure proposes a method for secure transfer of the data to the wireless device 110 from the information server 108 through the authentication server 106. The method is implemented in a security protocol, which is utilized as an extension of an EAP used by the wireless device 110 in the IEEE 802.11 Wi-Fi network 102 and the IEEE 802.16 WiMAX network 104. The wireless device 110 operatively communicates with the authentication server 106 using a first channel. A second channel for operative communication is established between the authentication server 106 and the information server 108. The method for secure transfer of the data by the wireless device 110 from the information server 108 through the authentication server 106 will be described in conjunction with FIG. 2.

Figure 2:
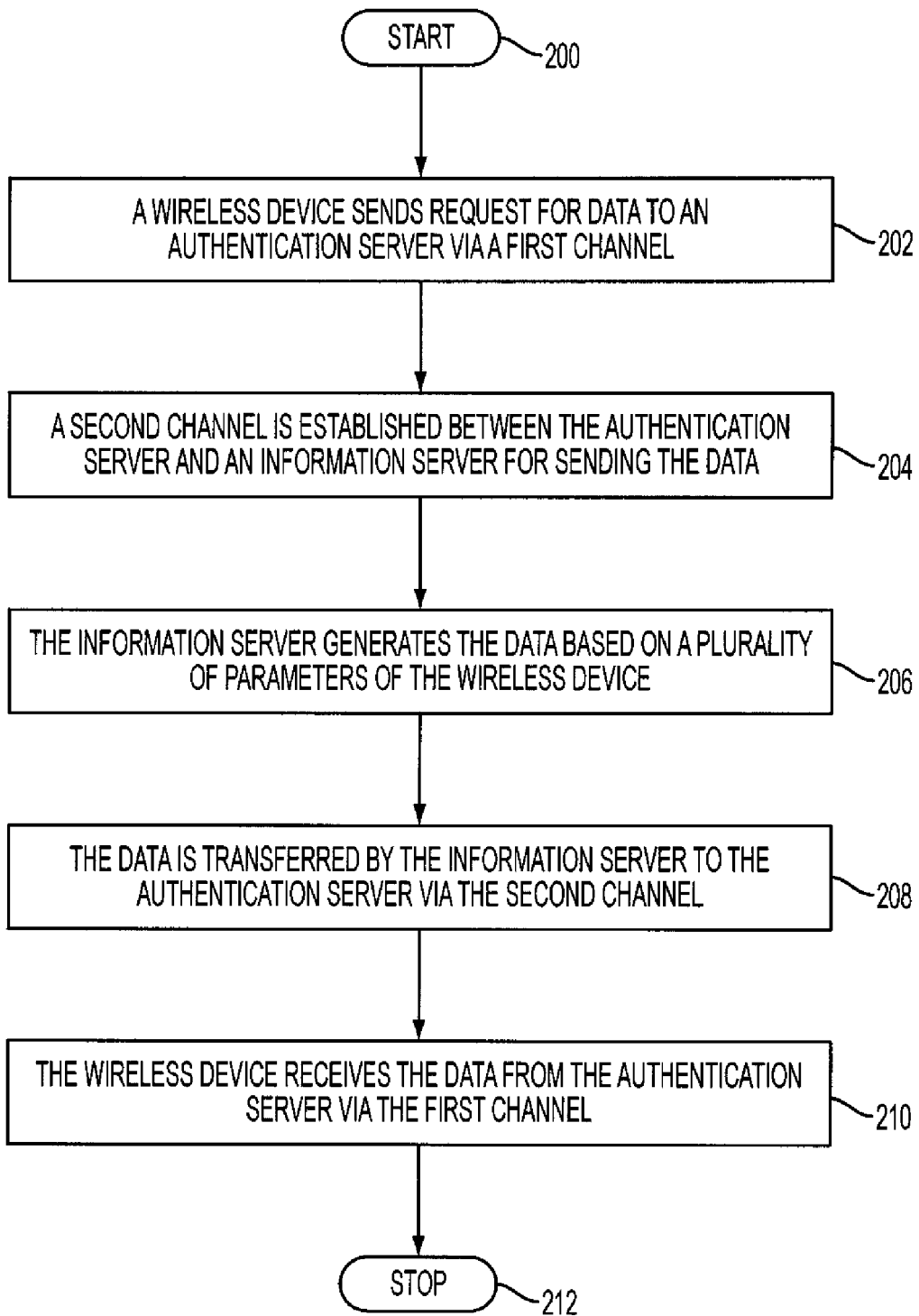
FIG. 2 is a flow diagram illustrating a method for enabling roaming of a wireless device in a plurality of wireless networks, according to an embodiment of the present disclosure.

FIG. 2 is a flow diagram illustrating a method for enabling roaming of a wireless device, such as the wireless device 110, in the plurality of wireless networks. The method initiates at 200 when the wireless device 110 completes an authentication with the authentication server 106. It will be evident to those skilled in the art that the authentication authenticates the wireless device 110 with the plurality of wireless networks using protocols such as EAP including typical authentication techniques like traditional passwords, token cards, digital certificates and public-key authentication.

The authentication framework is completed via a first channel between the wireless device 110 and the authentication server 106. The first channel may be an EAP channel for ensuring secure transfer of the data between the wireless device 110 and the authentication server 106. Furthermore, encryption and decryption keys may be exchanged between the wireless device 110 and the authentication server 106 for ensuring secure transfer of the data.

At 202, a request for a data element is sent by the wireless device 110 through the first channel to the authentication server 106. The data element, which may be included in the transferred data, may enable the wireless device 110 to roam between the plurality of wireless networks, for example the IEEE 802.11 Wi-Fi network 102 and the IEEE 802.16 WiMAX network 104.

At 204, a second channel for operative communication is established between the authentication server 106 and the information server 108. The second channel is a secure channel that ensures the secure transfer of the data between the authentication server 106 and the information server 108. The second channel may be established using security protocols such as Internet Protocol Security (IPSec) protocol, Secure Sockets Layer (SSL) protocol, and/or a National Institute of Standards and Technology (NIST) Key Wrap protocol, and/or other security protocol. The authentication server 106 sends the request for the data to the information server 108 through the second channel. At 206, the information server 108 generates data after receiving the request for the data from the authentication server 106.

The information server 108 generates the data element comprising the plurality of data based on a plurality of parameters corresponding to the wireless device 110. The plurality of parameters may include location of the wireless device 110, roaming policy of networks in vicinity of the wireless device 110, attributes of the wireless device 110, billing information, network selection preferences, and the like. The data may include the wireless service provider's preferred wireless network selection criteria, service choices of a user of the wireless device 110 (for example, preferred voice mail, calling features, minimum data rates for transfer of data and the like.) Furthermore, the data may include billing and usage restrictions for the wireless device 110, characteristics of the plurality of wireless networks (for example Quality Of Service (QOS) support and security support, network load in each of the plurality of the wireless networks, and the like.) The information server 108 also keeps track of roaming policies of the plurality of wireless networks, attributes and dynamic connection attributes for the wireless device 110 while generating the data element.

At 208, the data element comprising the data is transferred from the information server 108 to the authentication server 106 through the second channel. At 210, the data element comprising the data is received by the wireless device 110 from the authentication server 106 through the first channel. The secure transfer of the data to the wireless device 110 from the information server 108 through the authentication server 106 enables roaming of the wireless device 110 between the plurality of wireless networks. The method terminates at 212 when the wireless device switches to another network in the plurality of wireless networks using the data.

Furthermore, the wireless device 110 is an IEEE 802.21 enabled device and uses mechanisms defined in IEEE 802.21 to roam between the plurality of wireless networks. It will be evident to those skilled in the art that the wireless device 110 may include an IEEE 802.21 driver, a cryptographically independent processor, and a logical function. Further, the IEEE 802.21 driver may include link layer drivers for the IEEE 802.11 Wi-Fi network 102 and the IEEE 802.16 WiMAX network 104, or similar link layer drivers. The cryptographically independent processor executes security protocols and may provide additional security guarantees beyond what is provided by a Central Processing Unit (CPU) or an Operating System (OS). The logical function calculates physical location of the wireless device 110 and may be independent of the CPU or the OS and may prevent host-based attacks on the wireless device 110.

In an alternate embodiment of the present disclosure, in order to save power of the wireless device 110, security protocols may be executed by one of a Manageability Engine (ME), a core of a plurality of cores or a virtual partition of the wireless device 110.

Figure 3:
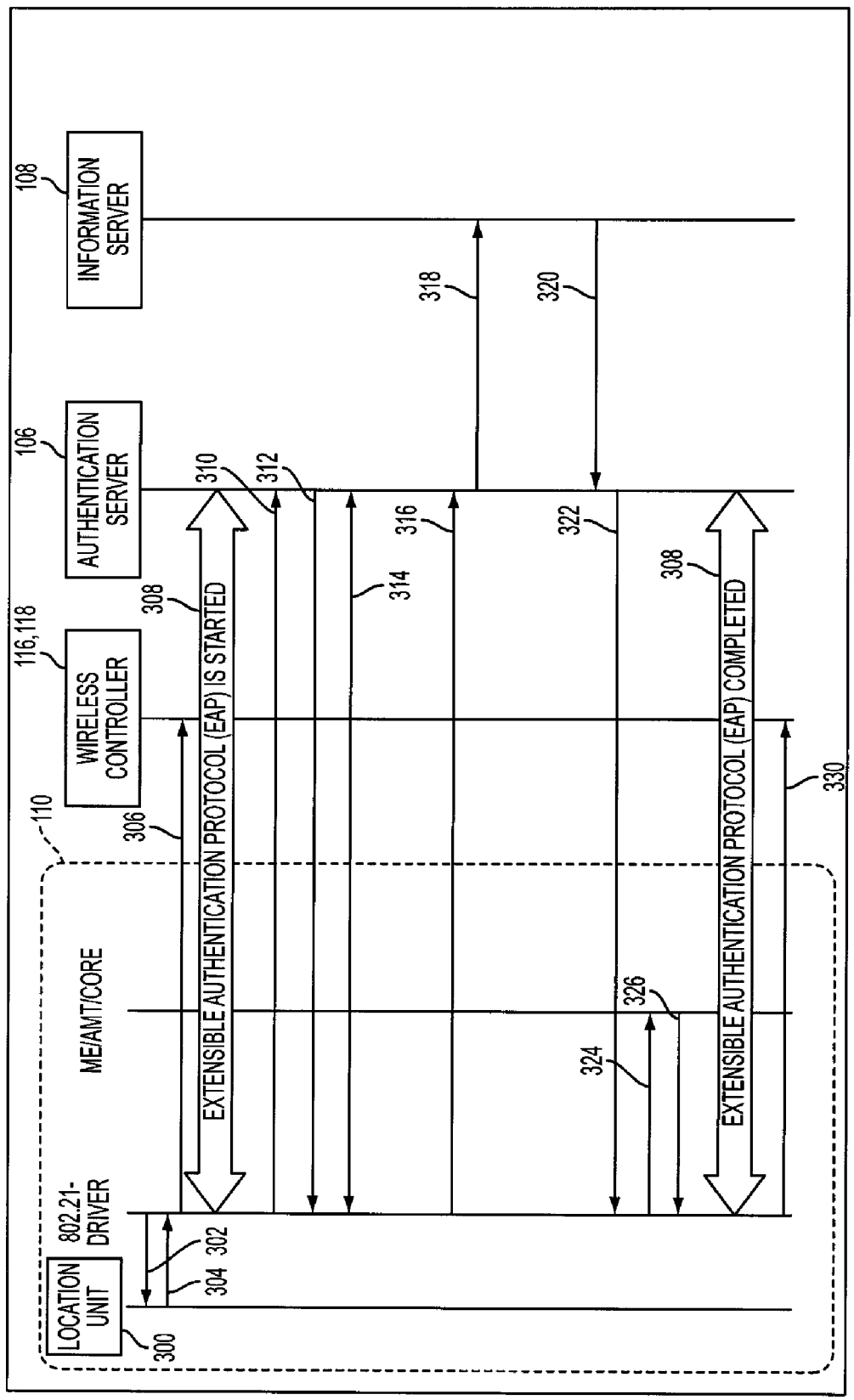
FIG. 3 is a diagram illustrating message flows for enabling roaming of a wireless device in a plurality of wireless networks, according to an embodiment of the present disclosure.

FIG. 3 is a diagram illustrating message flows for enabling roaming of the wireless device 110 in a plurality of wireless networks. A location unit 300 in the wireless device 110 requests for a location of the wireless device 110 by sending a message 302 to an IEEE 802.21 driver in the wireless device 110. The IEEE 802.21 driver sends the location of the wireless device 110 using a logical function "loc ( )" to the location unit 300 in a message 304. The IEEE 802.21 driver scans a wireless network, such as the IEEE 802.11 Wi-Fi network 102 or the IEEE 802.16 WiMAX network 104, performs network association procedures and establishes communication using a message 306 with a wireless controller (for example the IEEE 802.11 controller 116 or the IEEE 802.16 controller 118) based upon the wireless network in which the wireless device 110 is present. If the wireless device 110 is in the IEEE 802.11 network 102, then IEEE 802.21 driver establishes communication with the IEEE 802.11 controller 116. Thereafter, a first channel 308 is established between the IEEE 802.21 driver of the wireless device 110 and the authentication server 106.

The IEEE 802.21 driver exchanges security credentials of the wireless device 110 with the authentication server 106 via the first channel 308 using a message 310. The security credentials of the wireless device 110 may include an IEEE 802.21 driver security certificate, an IEEE 802.21 driver platform Identification number (ID) for uniquely identifying the IEEE 802.21 driver, and a ME ID for uniquely identifying the ME of the wireless device 110. The authentication server 106 exchanges security credentials of the authentication server 106 with the wireless device 110 via the first channel 308 using a message 312. The security credentials of the authentication server may include a security certificate of EAP server; an authentication server 106 Identification number (ID) for uniquely identifying the authentication server 106, and an information server 108 ID for uniquely identifying the information server 108.

The authentication server 106 and the IEEE 802.21 driver exchange security parameters to mutually derive encryption and decryption keys in a message 314 for ensuring safe transfer of the plurality of data between the authentication server 106 and the wireless device 110. For example, Master Session Keys (MSK) and Extended Master Session Keys (EMSK) may be derived between the authentication server 106 and the IEEE 802.21 driver. The mutual authentication of the authentication server 106 and the IEEE 802.21 driver results in an integrity protected, encrypted first channel for secure transfer of the plurality of data. The IEEE 802.21 driver requests for a plurality of data to the authentication server 106 via the first channel using a message 316. The IEEE 802.21 driver also provides the location of the wireless device 110, IEEE 802.21 driver platform ID, and the ME ID to the authentication server 106 in a message 316.

The authentication server 106 sends the request for the data to the information server 108 via the second channel (established between the authentication server 106 and the information server 108) using a message 318. The authentication server 106 sends the location of the wireless device 110, the IEEE 802.21 driver platform ID, and the ME ID to the information server 108 in a message 318. The information server 108 generates the data element comprising the data and sends the data element to the authentication server 106. The data element is signed with the ME ID in a message 320. The authentication server 106 sends the data element, the IEEE 802.21 driver platform ID, and the ME ID to the IEEE 802.21 driver in a message 322. The IEEE 802.21 driver verifies sign of the data element with the ME by sending a message 324 to the ME. The ME verifies the sign using Key Confirmation Key (KCK) and stores the data element for enabling roaming of the wireless device 110 when the wireless device 110 is in a power save mode.

The ME sends a message 326 to the IEEE 802.21 driver indicating whether the sign has been verified or not. If the sign has been verified then the IEEE 802.21 driver stores the plurality of data in the wireless device and uses the plurality of data to enable the roaming of the wireless device 110 in the plurality of wireless networks. If the sign has not been verified, then the wireless device 110 sends the request for the data to the information server 108 through the authentication server 106. The message flows described above are repeated (and the same are not delineated again here in the interest of brevity.) The first channel is terminated by the IEE 802.21 driver when the wireless device 110 receives the data in the data element from the information server 108 through the authentication server 106.

It will evident to those skilled in the art that the messages such as the message 302, the message 304, the message 306, the message 308, the message 310, the message 312, the message 314, the message 316, the message 318, the message 320, the message 322, the message 324, the message 326, the message 328 and the message 330 may comprise data packets that include bytes for a header information, a source address, a destination address, in addition to actual information bytes and bytes for error correction.

The present disclosure provides a solution for security, performance, and deployment needs of operators and manufacturers that deploy IEEE 802.21 enabled wireless devices. The wireless device 110 may include one or more platform technologies (e.g., processors and or logic sets) configured to provide additional security features such as Active Management Technology (AMT), and/or dedicated processor technology such as a manageability engine (ME), virtual partition, and/or the core of the plurality of cores to provide additional security for the transfer of plurality of data.

In a conventional technique, the wireless device 110 connects to the information server 108 and downloads the plurality of data that enables the roaming of the wireless device 110 in the plurality of wireless networks. However, in the conventional technique considerable changes in the infrastructure of the plurality of wireless networks is required. Furthermore, the conventional technique of establishing connection to the information server 108 to retrieve the data may involve significant overhead and latency. More significantly, the conventional technique contemplates continued connection to a wireless network of the plurality of wireless networks, for example an IEEE 802.11 network, where the wireless device 110 is roaming out, in order for the wireless device 110 to get the plurality of data. This leads to an increase in consumption of power of the wireless device 110 due to transmission retries by the wireless device 110 to the information server 108 and roaming latency of the wireless device 110.

In the present disclosure the data is delivered to the wireless device 110 at the time of authentication of the wireless device 110. Hence, the wireless device 110 may use the data as needed to enable roaming of the wireless device 110 in the plurality of wireless networks. Thus, a system comprising a wireless device such as the wireless device 110, an authentication server such as the authentication server 106, and an information server such as the information server 108 provides the data to the wireless device at the time of authentication. As such, the need for any additional software stack implementation, or to make modifications to existing infrastructure for the plurality of wireless networks, is precluded. Thus the system offers a feasible method for enabling roaming of the wireless device while utilizing existing infrastructure of the plurality of wireless networks.

The present disclosure may utilize the AMT, the ME and a plurality of cores in the wireless device 110 for providing secure verification of the data delivered from the information server 108 to the wireless device 110. Further, the present disclosure may permit the information server 108 to be coupled with a plurality of EAP Authentication servers (also known as an authentication, authorization and accounting ("AAA") server), thereby permitting the operators to run a single information server with a plurality of administrative domains or the plurality of wireless networks. The present disclosure may thus provide wireless device authentication, a confidentiality of discovery policy, and network attributes along with integrity protection of the data.

As described above, the embodiments of the disclosure may be embodied in the form of computer-implemented processes and apparatuses for practicing those processes. Embodiments of the disclosure may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the disclosure and various embodiments with various modifications as are suited to the particular use contemplated. It is understood that various omissions, substitutions of equivalents are contemplated as circumstance may suggest or render expedient, but such are intended to cover the application or implementation without departing from the spirit or scope of the claims of the present disclosure.

What is claimed is:

1. A method for secure transfer of data for enabling roaming of a wireless device in a plurality of wireless networks, the method comprising:

sending a request for the data by the wireless device to an authentication server via a first channel between the wireless device and the authentication server;

establishing a second channel between the authentication server and an information server, wherein the authentication server sends the request for the data to the information server via the second channel;

generating the data by the information server based on a plurality of parameters of the wireless device;

transferring the data by the information server to the authentication server via the second channel between the authentication server and the information server; and receiving the data by the wireless device from the authentication server via the first channel, wherein the secure transfer of the data received by the wireless device from the information server through the authentication server enables roaming of the wireless device in the plurality of wireless networks.

2. The method of claim 1, wherein the data is one of a billing information, a roaming information, a security information, a usage restriction, a network selection criteria, a user configured service choice and a characteristic of the plurality of wireless networks.

3. The method of claim 1, wherein a wireless network of the plurality of wireless networks is one of an IEEE 802.11 Wireless Fidelity (Wi-Fi) network, an IEEE 802.16 Worldwide Interoperability for Microwave Access (WiMAX) network and a third Generation (3G) network.

4. The method of claim 1, wherein the wireless device is an IEEE 802.21 enabled computing device.

5. The method of claim 1, wherein the second channel is established using one of an Internet Protocol Security (IPSec) protocol, Secure Socket Layer (SSL) protocol, or a NIST Key Wrap protocol.

6. The method of claim 1, wherein the information server is an IEEE 802.21 information server.

7. The method of claim 1, wherein the authentication server is an Extensible Authentication Protocol (EAP) server.

8. The method of claim 1, wherein the wireless device comprises a logical function for calculating location of the wireless device in the plurality of wireless networks.

9. A computer program product embodied on a computer readable medium for secure transfer of data for enabling roaming of a wireless device in a plurality of wireless networks, the computer program product comprising a program module having instructions for:

sending a request for data by the wireless device to an authentication server via a first channel between the wireless device and the authentication server;

establishing a second channel between the authentication server and an information server, wherein the authentication server sends the request for the data to the information server via the second channel;

generating the data by the information server based on a plurality of parameters of the wireless device;

transferring the data by the information server to the authentication server via the second channel between the authentication server and the information server; and receiving the data by the wireless device from the authentication server via the first channel, wherein the secure transfer of the data received by the wireless device from the information server through the authentication server enables roaming of the wireless device in the plurality of wireless networks.

10. The computer program product of claim 9, wherein the data is one of a billing information, a roaming information, a security information, a usage restriction, a network selection criteria, a user configured service choice and a characteristic of the plurality of wireless networks.

11. The computer program product of claim 9, wherein a wireless network of the plurality of wireless networks is one of an IEEE 802.11 Wireless Fidelity (Wi-Fi) network, an IEEE 802.16 Worldwide Interoperability for Microwave Access (WiMAX) network and a third Generation (3G) network.

12. The computer program product of claim 9, wherein the wireless device is an IEEE 802.21 enabled computing device.

13. The computer program product of claim 9, wherein the information server is an IEEE 802.21 information server.

14. The computer program product of claim 9, wherein the authentication server is an Extensible Authentication Protocol (EAP) server.

15. The computer program product of claim 9, wherein the wireless device comprises a logical function for calculating location of the wireless device in the plurality of wireless networks.

16. A system for secure transfer of data for enabling roaming in a plurality of wireless networks, the system comprising:

a wireless device capable of operating in the plurality of wireless networks;

an authentication server capable of operative communication with the wireless device; and an information server capable of operative communication with the authentication server, wherein the wireless device sends a request for the data to the authentication server via a first channel between the wireless device and the authentication server, wherein the authentication server sends the request for the data to the information server via a second channel between the authentication server and the information server, wherein the information server generates the data based on a plurality of parameters of the wireless device and transfers the data to the authentication server via the second channel, wherein the data is transferred by the authentication server to the wireless device, and wherein the secure transfer of the data enables roaming of the wireless device in the plurality of wireless networks.

17. The system of claim 16, wherein a wireless network of the plurality of wireless networks is one of an IEEE 802.11 Wireless Fidelity (Wi-Fi) network, an IEEE 802.16 Worldwide Interoperability for Microwave Access (WiMAX) network and a third Generation (3G) network.

18. The system of claim 16, wherein the wireless device is an IEEE 802.21 enabled computing device.

19. The system of claim 16, wherein the information server is an IEEE 802.21 information server.

20. The system of claim 16, wherein wireless device includes one or more of Active Management Technology (AMT), a manageability engine (ME), virtual partition, or one or more cores of a plurality of processor cores.

* * * * *